Sept. 15, 1970    C. W. CHAPMAN    3,528,264
ROTATABLE COUPLINGS
Filed March 25, 1968    4 Sheets-Sheet 1

Inventor
Charles Wallace Chapman
his attorneys

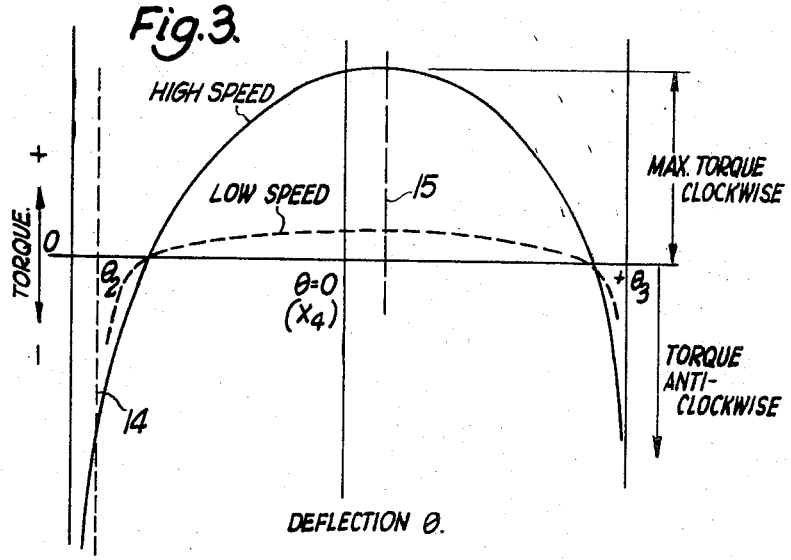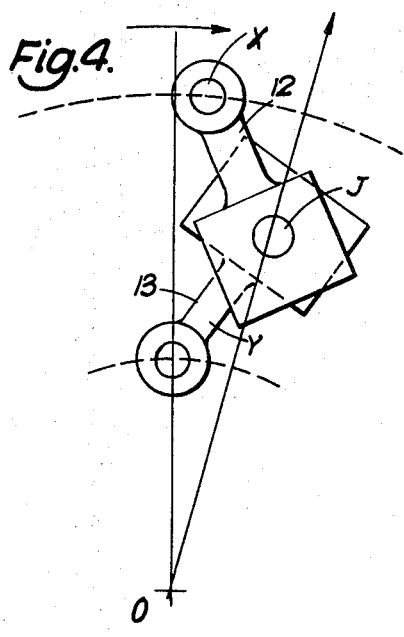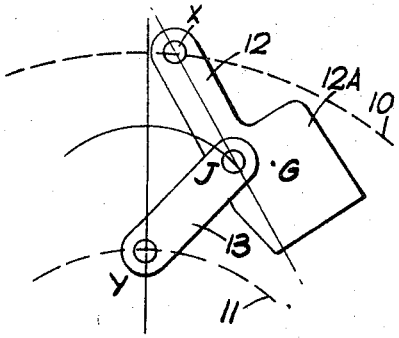

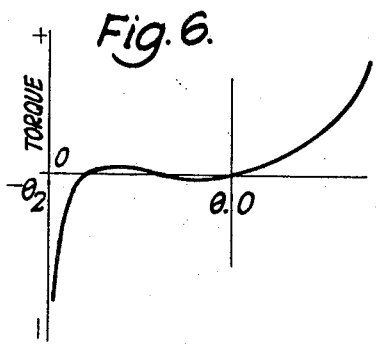
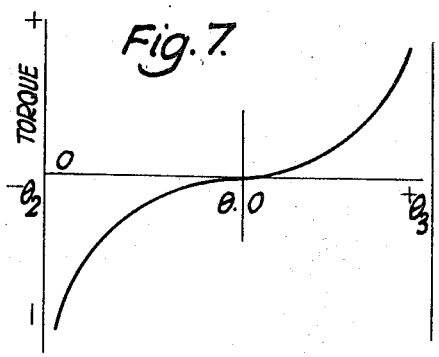
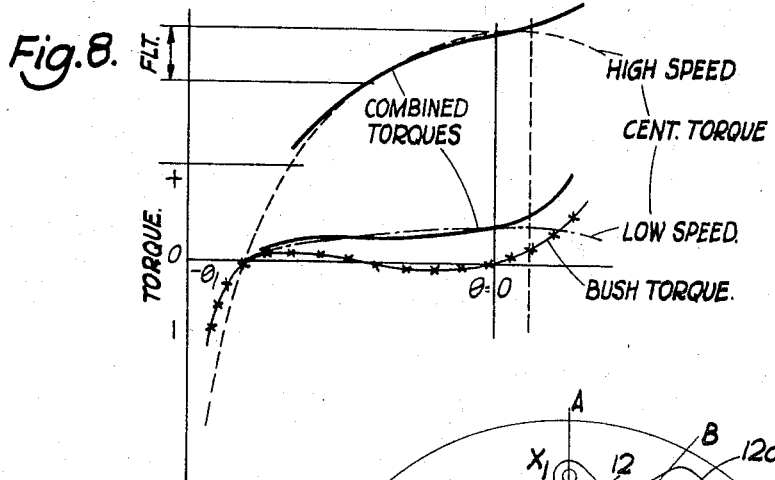
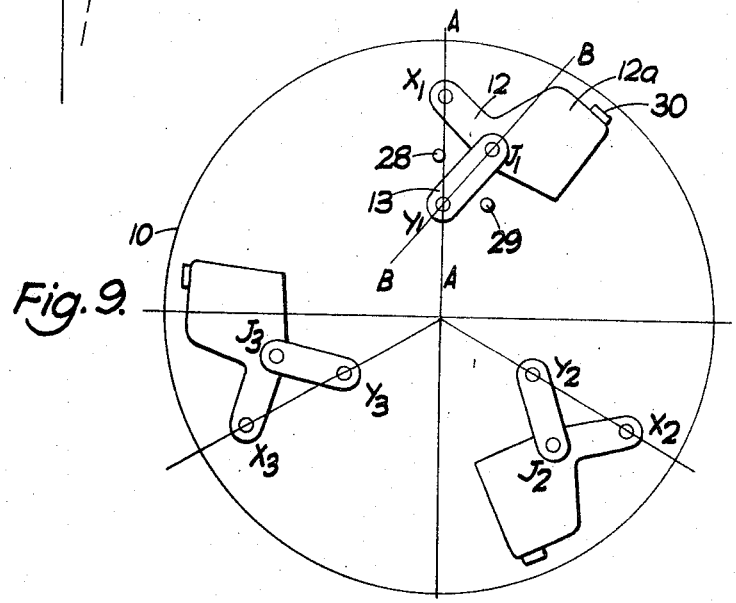

Sept. 15, 1970     C. W. CHAPMAN     3,528,264
ROTATABLE COUPLINGS
Filed March 25, 1968     4 Sheets-Sheet 4
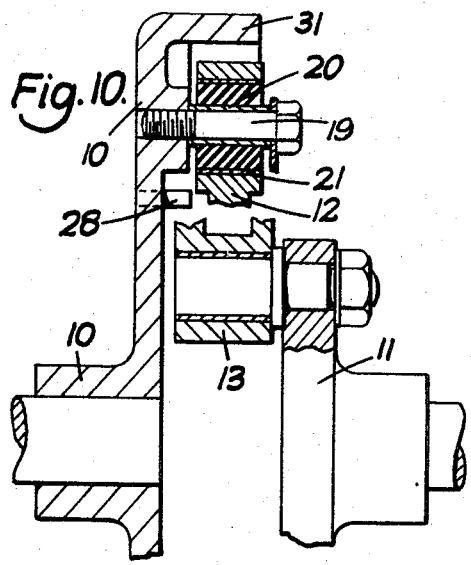
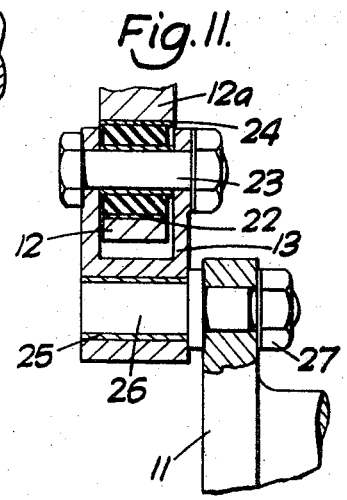
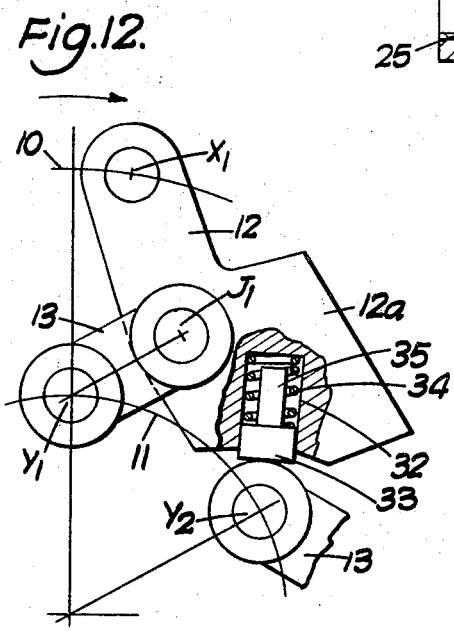
Inventor
Charles Wallace Chapman

United States Patent Office 3,528,264
Patented Sept. 15, 1970

3,528,264
ROTATABLE COUPLINGS
Charles Wallace Chapman, Winchelsea, England, assignor to Twiflex Couplings Limited, Twickenham, Middlesex, England, a British company
Filed Mar. 25, 1968, Ser. No. 715,634
Claims priority, application Great Britain, Apr. 5, 1967, 15,704/67
Int. Cl. F16d 3/60
U.S. Cl. 64—19                    7 Claims

ABSTRACT OF THE DISCLOSURE

A coupling comprises rotatable driving and driven members between which is pivotally connected a number of linkages each comprising two links connected together by a pivotal connection, the links being so arranged that the linkage is deformed by relative rotation between the driving and driven members in at least one direction. The pivotal connection between the links is the only connection between them, and the centre of gravity of the linkage is so so arranged that, in the normal operating speed range of the coupling, the major part of the torque transmitted by the coupling is transmitted by the centrifugal force acting on the linkage. The centre of gravity of the linkage is at the pivotal connection between the links or is spaced from that connection on the leading side with respect to the direction of rotation of the coupling.

---

The invention relates to couplings of the kind comprising rotatable driving and driven members between which is pivotally connected at least one linkage comprising two links connected together by a pivotal connection, which links are so arranged that the linkage is deformed by relative rotation between said members in at least one direction.

According to the invention, a coupling of the kind referred to is characterised in that the pivotal connection between the links is the only connection between the links, and in that the centre of gravity of the linkage is so arranged that, in the normal operating speed range of the coupling, the major part of the torque transmitted by the coupling is transmitted by the centrifugal force acting on the linkage.

The links of the linkage may be connected to the driving and driven members respectively by pivotal connections which are spaced radially apart along a radius of the coupling.

Preferably the pivotal connection between the two links is disposed on the leading side, with respect to the direction of rotation of the coupling, of a line joining the pivotal connections between the linkage and the driving and driven members respectively.

The centre of gravity of the linkage may be located at or near the pivotal connection between the two links. Alternatively the centre of gravity of the linkage may be spaced away from the pivotal connection between the two links, on the leading side thereof with respect to the direction of rotation of the coupling. In this case the radial line passing through the centre of gravity of the linkage may be disposed on the leading side of the pivotal connection between the linkage and the driving member in all relative rotational positions of the two coupling members between the opposite limits of deformation of the linkage.

In any of the above arrangements the linkage and its centre of gravity may be so arranged that as the linkage approaches the limit of its deformation due to relative rotation between the driving and driven members in one direction, the torque applied to the driven member by the centrifugal force on the linkage approaches an infinite value in one sense, and the torque, as the linkage deforms from said one limit, falls to zero and rises to a maximum in the opposite sense before falling to zero again and then rising towards an infinite value in said one sense once again as the other limit of deformation of the linkage is approached.

Preferably the stiffness of the linkage is substantially zero at the position of maximum torque in said opposite sense.

In any of the above arrangements a resilient bush may be provided at the pivotal connection between the links. There may also be provided a resilient bush at a pivotal connection between the linkage and a coupling member.

The bush may be attached to each of the two parts which it connects so as to transmit a torque from the driving member to the driven member upon relative rotation between those members, the torque transmitted in this manner being less than the torque transmitted by centrifugal force.

The following is a more detailed description of various embodiments of the invention reference being made to the accompanying drawings in which:

FIG. 3 is a curve showing the variation of the torque applied to the driven member of a coupling with variation in the angular deflection between the driving and driven members at high and low speeds, when the centre of gravity of the linkage is at or near the pivotal connection between the two links;

FIG. 4 shows diagrammatically one form of linkage, for connection between the driving and driven members of a coupling, where the centre of gravity of the linkage is at or near the pivotal connection between the links;

FIG. 5 shows an alternative form of linkage in which the centre of gravity is displaced from the pivotal connection between the links;

FIG. 6 is a curve showing the variation of torque caused by the twisting of a torsionally elastic bush at the pivot X in the arrangement of FIG. 1;

FIG. 7 is a corresponding curve to that of FIG. 6 where an elastic bush is disposed at the pivot J instead of at the pivot X;

FIG. 8 is a curve showing the combination of torques due to centrifugal force and an elastic bush at the pivot X, showing the effect of such a bush at high and low speeds;

FIG. 9 is a view looking onto the driving member of a typical design of coupling, the driven member being removed for clarity;

FIG. 10 is a section along the line A—A of FIG. 10;

FIG. 11 is a section along the line B—B of FIG. 10; and

FIG. 12 is a similar view to FIG. 5 showing an alternative stop mechanism.

Figure 1:
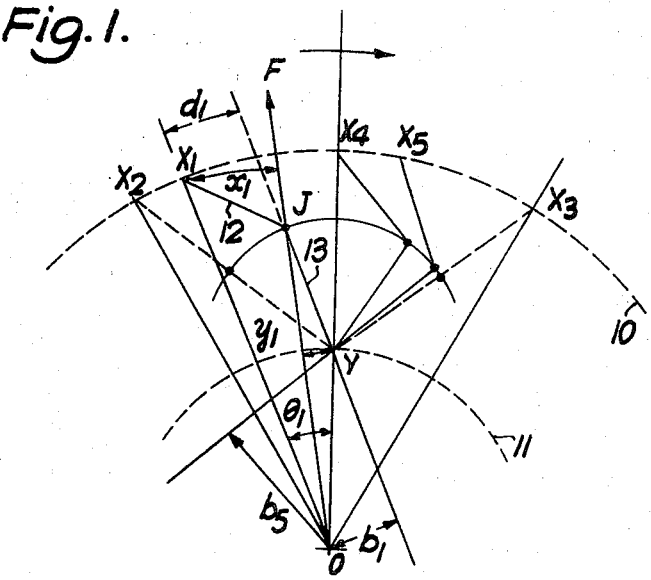
FIG. 1 is a diagrammatic representation of one linkage of a simple form of coupling according to the invention, the centre of gravity of the linkage being disposed at the pivotal connection between the two links.

In the arrangement of FIG. 1 a disc-like driving member of a coupling is indicated diagrammatically at 10 and a coaxial driven member is indicated at 11. One or more linkages are connected between the driving and driven members and each linkage comprises two links 12 and 13. One end of the link 13 is pivotally connected at Y to the driven member 11, the other end of the link 13 is pivotally connected at J to one end of the link 12, and the other end of the link 12 is pivotally connected at X to the driving member 10. The coupling is arranged to rotate clockwise as seen in FIG. 1 and the pivot J is ahead of the pivot X in the direction of rotation (as in position X4). It will be appreciated that when there is relative rotation between the driving and driven members 10 and 11 about the centre of rotation O the linkage deforms and five different positions X1, X2, X3, X4 and X5 of the X pivot relatively to the Y pivot are shown in FIG. 1.

Referring to the dimensions indicated in FIG. 1: $\theta$ is the angular extent of the relative rotation between the driving and driven members, $\theta$ is zero when O, Y and X are radially in line (as in position X4) in FIG. 1. $\theta$ is regarded as positive when the pivot X is displaced in the direction of rotation (as in positions X3 and X5) and negative when the pivot X is displaced in the opposite direction (as in positions X1 and X2); $x$ is the perpendicular distance of the X pivot from the radius passing through the centre of gravity of the linkage (at J): $y$ is the perpendicular distance of the Y pivot from this radius; $d$ is the perpendicular distance of the X pivot from the line of the link 13; and $b$ is the perpendicular distance of this link from the centre of rotation O; $b$ is regarded as positive when it lies to the left of the line OY (as at $b_5$) and negative when it lies to the right of the line OY (as at $b_1$). Suffixes 1, 2, 3, 4 and 5 will be applied to the terms $\theta$, $x$, $y$, $d$ and $b$ to indicate the value of these at the corresponding positions of X. Thus, for example, $b_5$ is the value of $b$ at position X5.

The centre of gravity of the linkage is assumed to be located at J, and F indicates the centrifugal force acting on the linkage.

It will be seen that the load in the link 12 equals $Fy/d$ and that the load in the link 13 equals $Fx/d$. These loads may be tension or compression loads according to how the line of action of the centrifugal force is disposed in relation to the links. In position X1 both links 12 and 13 are in tension whereas in position X4, in which X and Y pivots lie on a radius, link 12 is in compression and link 13 is in tension.

When the links are in line, at the limiting positive deflection position X3, both links are in compression, and at the negative limiting position X2, both links are in tension.

The torque transmitted to the driven member 11 is equal to the load in link 13 multiplied by $b$, which equals $Fxb/d$. With the driving member rotating clockwise, this torque is anticlockwise at position X1 and clockwise in position X4. It will be appreciated that the torque is zero when, at some negative value of $\theta$, the link 13 lies along a radius since in such a position $b$ is zero. The torque is also zero when, at some position value of $\theta$, the link 12 lies along a radius since in this position $x$ is zero.

Since the torque equals $Fxb/d$ it will be appreciated that the torque tends to infinity as the linkage approaches either of the limiting positions X2 and X3 since as the linkage approaches either of those positions the distance $d$ tends to zero.

Figure 2:
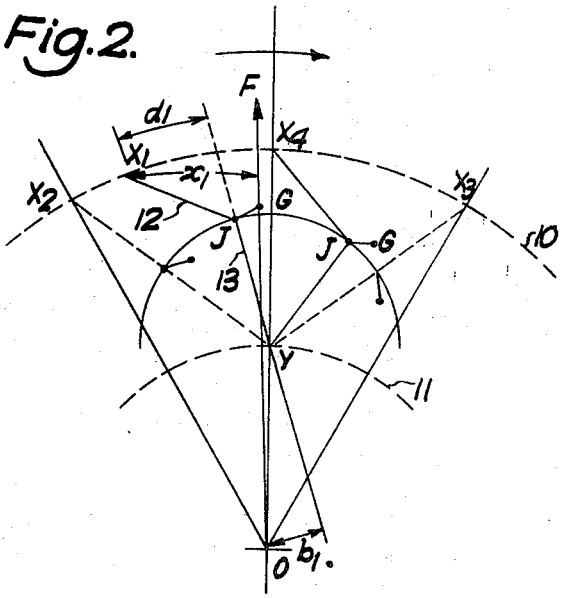
FIG. 2 is a similar view to FIG. 1 of a linkage of an alternative form of coupling in which the centre of gravity of the linkage is displaced from the pivotal connection between the two links.

The arrangement of FIG. 2 is similar to that of FIG. 1 except that the centre of gravity G is not located at the pivot J but is disposed on the leading side of J in the direction of rotation. As before, $x$ is the perpendicular distance of the X pivot from the radius passing through the centre of gravity, and the torque transmitted to the driven member 11 is $Fxb/d$.

The variation in torque applied to the driven member 11 with variation in deflection is shown in the curve of FIG. 3. When the coupling is in the X2 position of FIG. 1 or FIG. 2, i.e. the two links in line, the angular deflection between the driving and driven members is at its maximum negative value (i.e. maximum value to the left of OY) and the centrifugal torque tends to infinity in the anti-clockwise direction. As the deflection increases in a positive direction, i.e. as X moves clockwise relative to Y towards the position in which the X and Y pivots lie along a radius, the centrifugal torque falls to zero at the point where the link 13 lies along a radius. Thereafter the centrifugal torque rises to a maximum in the clockwise direction which is reached when there is a small positive deflection of the coupling from position X4. Thereafter the centrifugal torque in the clockwise direction falls until it reaches zero again at a point where the radius passing through the centre of gravity of the linkage also passes through the pivot X. Thereafter the centrifugal torque tends to infinity in an anti-clockwise direction as the limiting position X3 is approached.

It will be appreciated that the torque due to centrifugal force changes from positive to negative as the radius passing through the centre of gravity of the linkage passes from the leading side to the trailing side of pivot X. In the arrangement of FIG. 2 the centre of gravity G of the coupling may be so located that the radius passing through the centre of gravity G always lies on the leading side of the pivot X, even when the coupling is at the extreme limiting position X3. In this case the torque transmitted by the coupling will always be positive for all positive deflections $\theta$. Wide variations in the shape of the torque curve and in the stiffness of the coupling at various torques may be made by suitably locating the centre of gravity of the linkage.

It will be appreciated that in this coupling the centrifugal force acting on the linkage opposes deformation of the linkage. Owing to this the stiffness of the coupling falls as the load or torque increases until at maximum torque on the driven member in the direction of rotation the stiffness is zero. This applies at any speed although the maximum torque for any given coupling varies as the square of the speed shown in FIG. 3.

The coupling is particularly suitable for constant speed drive such as generators or compressors where at a given speed the torque may vary from zero or maximum or may even be subsantially negative, i.e. the coupling may "over run" as for example on the road vehicle. The coupling shown which relies on centrifugal force to oppose deflection of the linkage is very suitable for such drives as it can cater for any over run condition or load variation at a given speed, and its stiffness, already low at no load, falls to around zero at maximum load where usually the forces exciting vibration in the coupling are themselves at a maximum.

Fixed stops may be provided on the coupling for limiting the range of deformation of the linkage and there are indicated at 14 and 15 in FIG. 2 the positions of the fixed stops to limit the range of operation of the coupling to the range between the lines 14 and 15. Thus the normal operating range of the coupling is between zero and maximum centrifugal torque with relative deflection between the driving and driven members in the clockwise direction whereas should the coupling "over run" so that there is relative rotation in the anti-clockwise direction the torque in this direction increases to a high value very rapidly.

As mentioned above, in the arrangement of FIG. 1, the centre of gravity of the linkage is assumed to be located at or near J, the point of pivotal connection between the two links. FIG. 4 shows means by which this may be achieved. In the arrangement of FIG. 4 it will be seen that the links 12 and 13 are so shaped that the bulk of the weight of each link is disposed around the pivotal connection J between the links. The two links may be similar, one link being disposed behind the other or one of the links may be so shaped as to straddle the other. Alternatively the bulk of the weight may be at the end of one link only, say link 12, link 13 comprising two light links straddling the weighted end of link 12.

The maximum positive torque (i.e. in the same direction on the driven member as on the driving member) occurs at a small positive deflection of the coupling from the position X4 in FIGS. 1 and 2 in which $\theta$ is zero. If the centre of gravity G of the linkage is disposed to lie on the leading side of J, as shown in FIG. 2, then at or around position X4, where θ is zero or has a low positive value, the value of $x$ is greater than it is in the corresponding position in the arrangement of FIG. 1. Thus for a given linkage and value of F the maximum positive torque $(Fxb)/d$ transmitted to the driven member, is greater than it is in the arrangement of FIG. 1. FIG. 5 shows a form of linkage to meet this condition, the major part of the weight of the linkage being in an extension 12a of the link 12, and the link 13 being two light links or a forked link straddling the link 12 at J.

In any of the above arrangements there may be provided resilient bushes at any of the pivotal connections between links or between links and coupling members to accommodate malalignment between the two parts of the coupling.

Such resilient bushes may be adapted to modify the shape of the torque curve shown in FIG. 3, particularly at low speeds or on starting or stopping when the torque due to centrifugal force is very low or negligible. A torsionally resilient bush may be fitted to the X pivot so as to be free of twist at any predetermined value of θ. If the bush is fitted at the X pivot such that it is free of twist at the position in which θ is zero and is twisted as the coupling deflects to either side of this position, it will exert a torque on the coupling driven member 11 generally as shown in FIG. 6. It will be seen from FIG. 6 that the torque exerted rises rapidly from minus infinity at the position in which θ has its maximum negative value ($-θ_2$). The torque then rises rapidly to a low positive value, and falls to zero when link 13 is radial. The torque then falls further to a low negative value and then returns to zero again at the position where θ equals zero and the bush is free of twist. The torque then rises rapidly to a positive value which would reach positive infinity if the deflection were continued to the positive limiting value of θ, i.e. to $θ_3$.

Similarly a torsionally resilient bush may be provided at J, again being arranged to be free of twist at any predetermined value of θ. FIG. 7 shows a torque/deflection curve for an arrangement in which the bush at J is free of twist in the position in which θ equals zero. As will be seen from FIG. 7 the torque exerted on the driven member by the bush will vary from minus infinity at the maximum negative value of θ, ($-θ_2$) to plus infinity at the maximum positive value of θ, ($θ_3$). The torque is zero when θ equals zero and the X and Y pivots are on a radius through centre of rotation, O. This torque curve will vary according to the θ value where the bush is free of twist. If the bush is set to be free of twist at some negative value of θ the torque curve will rise from minus infinity at $-θ_2$ to zero at the θ position where the bush is free of twist, then rise positive and fall to zero again at θ equals zero, whereafter it will again dip negative until a θ value on the positive side where the twist is again zero and the torque also; the torque will then rise rapidly to plus infinity at $θ_3$.

A torsionally resilient bush at Y will also introduce a bush torque on the coupling (the shape of the curve depending on the θ value where the bush is free of twist) such torque rising from minus infinity at $-θ_2$ to a relatively low positive value and then falling to minus infinity again at $θ_3$, being zero at the θ value where the bush is free of twist and again shortly before the coupling deflection reaches $θ_3$.

Any bushes at X, Y or J may be arranged to be free of twist at any value of values of θ.

FIG. 8 shows the effect of a bush at X set to be free of twist in the position in which θ equals zero, at full speed and at low speed. It will be seen that at full speed and in the normal working speed range of the coupling, the major part of the torque is transmitted by centrifugal force.

FIG. 9 shows diagrammatically a three linkage coupling according to this invention looking onto the driving member (in this case the outer member) with the driven member removed for clarity. FIG. 10 is a part section along the line A—A of FIG. 9 showing a torsionally elastic pivotal connection to the driving member and a plain bush pivot to the driven member. FIG. 11 is a part section along the line B—B of FIG. 9 and shows a torsionally elastic pivot between the ends of the links at J.

Referring to FIGS. 9 and 10, the disc-like driving member 10, arranged as drawn for clockwise rotation, has screwed into it at equal spacing three screws 19 which clamp the inner metal sleeves 20 of torsionally elastic bushes to the face of member 10. The outer sleeves 21 of these bushes are a press fit in the driving links 12 at X. The links 12 have weighted extensions 12a and are pivotally connected to the driven links 13 (as shown in FIG. 11) by further torsionally elastic bushes whose inner sleeves 22 are nipped by bolts 23 between the arms of the forked links 13, the outer sleeves 24 of the bushes being a press fit at J in the driving links 12. The driven links 13 are pivotally connected at Y to the driven member 11 by plain bushes 25 working on pins 26 rigidly secured to the member 11 by nuts 27. Stops, as diagrammatically indicated at 28 and 29 may if desired be fitted to limit the angular deflection of the driving member relatively to the driven member. These stops are indicated on FIG. 9 as two pegs 28, 29 for each linkage protruding from the driving member face to engage the driven links 13 at predetermined positive and negative values of θ. These stops may be solid or may be resilient, comprising, for example, rubber blocks or compression springs.

The construction shown in FIGS. 9, 10 and 11 and 12 is by way of example only and may be considerably varied within the scope of this invention. As previously stated, the bearings at X, Y and J may be of any known type and there may be any number of linkages. The lengths between the centres of the pivots or links 12 and 13 may be equal or unequal, either link being the longer, and the major part of the weight of a linkage may be in either link or divided between them. For a given linkage the radius of the X pivot from the centre of rotation O may, in a range of coupling designs, be widely varied, as may also, within physical limitations, be the radial distance between the X and Y pivots at θ=O. With a given linkage, the greater this distance then the less is the limiting angular deflection of the coupling from ($-θ_2$ to $θ_3$) and the more rapid the rate of change of stiffness with deflection.

In this design of coupling the working range is usually between some value of θ which approaches but is short of the limiting negative value $-θ_2$ and a positive value of θ where the positive torque is at or near its maximum. This positive value of θ is usually well short of the limiting value, $θ_3$. At any speed the "no load" value of θ, i.e. the angular deflection between the two halves of the coupling when no torque is being transmitted, is, for any given coupling, constant, being the θ value when the driven links 13 are radial and $b$ is zero. For a given coupling transmitting a given maximum torque the "full load" value of θ will be on the positive side of the "no load" value. At full load (i.e. maximum torque) if the maximum torque is substantially constant over a speed range the positive deflection load from the no load position falls with rise in speed since the maximum positive torque the coupling can transmit varies as the square of the rotational speed. With a wide speed range, at maximum speed the full and no load values of θ may almost coincide, i.e. full load θ may be only fractionally to the positive side of the position where the Y link 13 is radial. Any part of the link 12 is at its maximum distance from the centre of rotation O when the link 13 is radial, i.e. at the no load value of θ, and at small deflections of the coupling from this position the distance of any part of link 12 from O is barely altered from the "no load" distance, the distance from O reducing more and more rapidly as link 13 swings further from the radial position. Thus the part of link 12 marked 30 on FIG. 10 moves more or less radially outwards from position X4 on FIG. 1 to the position where link 13 is radial and then radially inwards as the coupling deflects to position X1. Further, the centrifugal force F and hence the load in the link 13 (which is $Fx/d$), increases as the square of rising speed and may put excessive loads on the pivots at J and Y at very high speeds. Since at such speeds on variable speed drives at any load from no load to full load the link 13 is always close to the radial position the part 30 of link 12 will always be at or near its maximum distance from O. A rim 31 may therefore be formed on the driving member 10 (see FIG. 10) to surround the linkages, its inside diameter being such that when link 13 is close to the radial position the part 30 of the link 12 is in contact with the inside of the rim. If the part 30 is made of a flexible material, and/or if the bushes at X, J or Y, or any two or all of them be flexible, then the link 13 will be able to pass the position where it is radial without jamming, but part of the centrifugal force will be resisted by the rim 31, so relieving the pivot bearings at J and Y of a calculable part of the load due to centrifugal force.

Owing to the low stiffness of this coupling, damping will not in most cases be necessary, but should it be desired friction or other types of dampers may be introduced between the driving and driven members 10 and 11.

FIG. 12 shows an alternative form of stop mechanism in which the part 12a of the link 12 is formed with a circular bore 32 in which is reciprocable a plunger 35 having a head 33. A helical compression spring 34 encircles the plunger 35 and is disposed between the head 33 and the bottom of the bore. The plunger is so disposed that the head 33 comes resiliently into engagement with the Y pivot ($Y_2$) of the adjacent linkages at the desired positive limit of the angular deflection between the two parts of the coupling.

I claim:

1. A coupling comprising: a rotatable driving member; a rotatable driven member; two links; a pivotal connection between one link and the driving member; a pivotal connection between the other link and the driven member; the pivotal connections connecting the links to the driving and driven members respectively being spaced radially apart along a radius of the coupling when the coupling is transmitting substantially no torque; a pivotal connection between the two links, which pivotal connection constitutes the only connection between the two links; the major part of the torque transmitted from the driving to the driven member, in the normal operating speed range of the coupling, being transmitted by the centrifugal force acting on the linkage.

2. A coupling comprising: a rotatable driving member; a rotatable driven member; two links; a pivotal connection between one link and the driving member; a pivotal connection between the other link and the driven member; a pivotal connection between the two links, which pivotal connection constitutes the only connection between the two links, and the pivotal connection between the two links being disposed on the leading side, with respect to the direction of rotation of the coupling, of a line joining the pivotal connections between the linkage and the driving and driven members respectively when the coupling is transmitting substantially no torque; the major part of the torque transmitted from the driving to the driven member, in the normal operating speed range of the coupling being transmitted by the centrifugal force acting on the linkage.

3. A coupling comprising: a rotatable driving member; a rotatable driven member; two links; a pivotal connection between one link and the driving member; a pivotal connection between the other link and the driven member; a pivotal connection between the two links, which pivotal connection constitutes the only connection between the two links; the centre of gravity of the linkage being disposed in the locality of the pivotal connection between the two links; the major part of the torque transmitted from the driving to the driven member, in the normal operating speed range of the coupling, being transmitted by the centrifugal force acting on the linkage; a resilient bush at the pivotal connection between the links, which bush is attached to each of the two parts which it connects so as to transmit a torque from the driving member to the driven member upon relative rotation between those members, the torque transmitted in this manner being less than the torque transmitted by centrifugal force.

4. A coupling according to claim 3 wherein the centre of gravity of the linkage is spaced away from the pivotal connection between the two links, on the leading side thereof with respect to the direction of rotation of the coupling.

5. A coupling according to claim 4 wherein a radial line passing through the centre of gravity of the linkage is disposed on the leading side of the pivotal connection between the linkage and the driving member in all relative rotational positions of the two coupling members between the opposite limits of deformation of the linkage.

6. A coupling comprising: a rotatable driving member; a rotatable driven member; two links; a pivotal connection between one link and the driving member; a pivotal connection between the other link and the driven member; a pivotal connection between the two links, which pivotal connection constitutes the only connection between the two links; the major part of the torque transmitted from the driving to the driven member, in the normal operating speed range of the coupling, being transmitted by the centrifugal force acting on the linkage; a resilient bush at a pivotal connection between the linkage and a coupling member, which bush is attached to each of the two parts which it connects so as to transmit a torque from the driving member to the driven member upon relative rotation between those members, the torque transmitted in this manner being less than the torque transmitted by centrifugal force.

7. A coupling according to claim 6 wherein the stiffness of the linkage is substantially zero at the position of maximum torque in said opposite sense.

References Cited

UNITED STATES PATENTS

| 1,363,745 | 12/1920 | Moore | 64—25 |
| 1,898,806 | 2/1933 | Baker | 64—19 X |
| 1,923,368 | 8/1933 | Goldschmidt | 64—25 |
| 2,829,507 | 4/1958 | Knudson | 64—25 |
| 2,910,844 | 11/1959 | Chapman | 64—19 |

JAMES A. WONG, Primary Examiner